Nov. 12, 1940.  D. E. GOMMEL  2,221,735
INSERTABLE TOOTH METAL SAW
Filed May 6, 1939
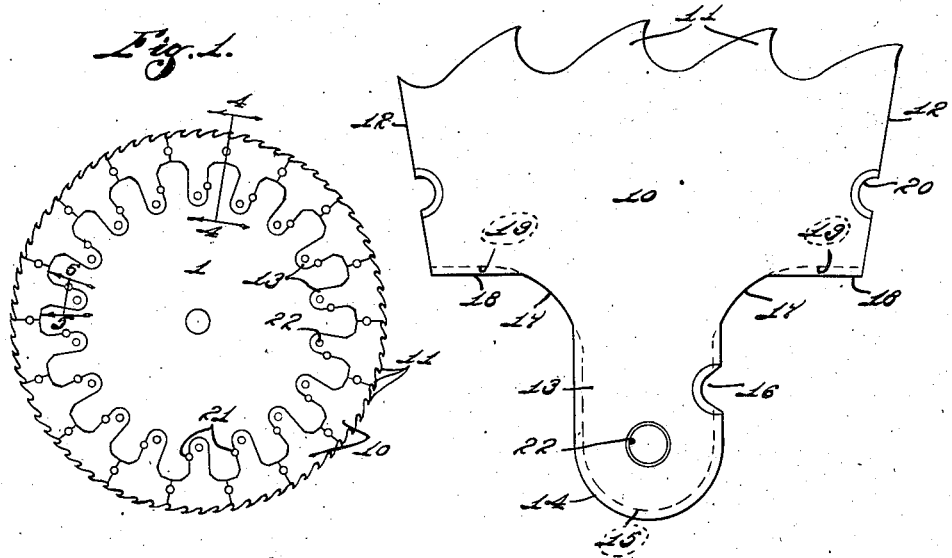
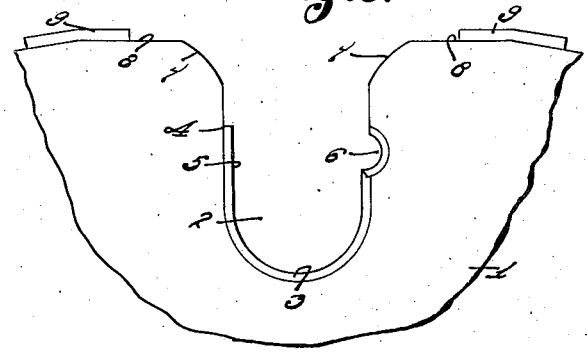
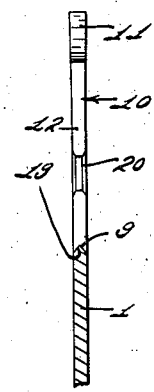
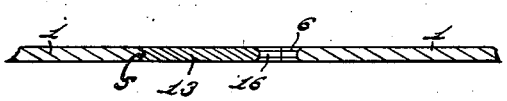
INVENTOR.
Dewey E. Gommel,
BY
Hood & Hahn.
ATTORNEYS.

Patented Nov. 12, 1940

2,221,735

UNITED STATES PATENT OFFICE 2,221,735

INSERTABLE TOOTH METAL SAW

Dewey E. Gommel, Indianapolis, Ind., assignor to
E. C. Atkins and Company, Indianapolis, Ind.,
a corporation of Indiana Application May 6, 1939, Serial No. 272,064

8 Claims. (Cl. 29—105)

The invention relates to improvements in metal cutting saws and more specifically to circular metal cutting saws of the insertable tooth type.

One of the objects of the invention is to provide a metal cutting saw in which the periphery of the circular saw consists of a plurality of segments, each having formed thereon one or more cutting teeth, which segments are adapted to be removably secured to a disc supporting member in such a manner that the connection will substantially resist lateral strains as well as circumferential strains.

For the purpose of disclosing the invention, an embodiment thereof is illustrated in the accompanying drawing, in which Fig. 1 is a side elevation of a portion of a circular saw embodying my invention;

Fig. 2 is an enlarged detail of a removable tooth segment;

Fig. 3 is an enlarged detail of a portion of a center disc showing the tooth socket;

Fig. 4 is an enlarged sectional view on the line 4—4 of Fig. 1; and

Fig. 5 is an enlarged sectional view on the line 5—5 of Fig. 1.

Referring to the structure illustrated in the drawing, the central disc 1 of the saw is provided with a plurality of sockets 2 extending inwardly from the periphery of the disc. These sockets, at their bottoms are rounded as at 3 and the walls of the socket up to the point 4 are provided with V-shaped fins 5. One wall of the socket is provided with a semi-circular countersunk opening 6. Above the fin 5, the walls of the socket continue straight for a portion thereof and then flare or curve outwardly as at 7 to merge into a flattened portion 8 which flattened portion at the extremity thereof is provided with a V-shaped fin 9. It is to be noted that this fin does not extend completely into the point where the curve 7 meets the flattened portion 8. Due to the angular disposition of the flattened portions 8 of the periphery of the disc, the periphery of the disc consists of a series of flattened segments 8 which lie adjacent one another.

The tooth segments 10 of the saw have the teeth 11 formed on the periphery thereof and their side edges 12 tapered inwardly so that in assembling the same on the disc 1, the adjacent edges of the segments will abut one another. Extending downwardly from each segment 10, equidistant from the two edges is a shank 13 having its periphery curved as at 14 to coincide with the curvature of the socket 2 and this shank is provided with a V-shaped recess 15 on its periphery to receive the V-shaped fin of the socket. A semi-circular segmental recess 16, countersunk, is formed in the edge of the tongue 13 to coincide with the countersunk recess 6 in the wall of the socket. The flared edges 17 are flattened to rest upon the flared walls 7 of the socket and the bottom edges 18 on each side of the tongue 13 are provided with V-shaped grooves 19 to receive the V-shaped tongues 9 on the periphery of the disc.

The segments 10 at each of the sides 12 are provided with semi-circular countersunk recesses 20 which, when the segments are assembled, coincide with a similar recess on the next segment to form rivet openings for the reception of rivets 21 which extend through these openings and are headed on each side. Rivets also pass through the rivet receiving openings formed by the coincident recesses 6 and 16 being headed on each side. These rivets therefore securely tie not only the segments to the disc 1 but also tie the segments to one another so that the tendency of the peripheral segments to become dislodged under the action of centrifugal force set up by rotation of the saw, is effectually resisted.

Furthermore, due to the flattened shoulders 8 on the disc and the flattened bottom edges 18 on the segments, the segments fit flatly and tightly against the periphery of the disc and are therefore rigidly seated on the disc.

In addition to the rivet receiving recesses heretofore described, the tongue 13 is provided with a countersunk opening 22 which extends clear through and which provides, while the saw is cutting, for the passage of the cutting compound from one side of the segments to the other.

I claim as my invention:

1. In a circular saw, the combination with a hub disc having a plurality of sockets radially extending inwardly from the periphery of the disc, both the walls of said sockets being provided with fins, said disc having peripheral flat segments disposed on each side of the sockets, of a plurality of tooth-carrying segments adapted for support on said disc, each having a shank disposed intermediate of its ends adapted to fit the sockets in the disc, both the side walls of said shank having fin-receiving recesses therein, said tooth-carrying segments having a flat bearing surface on its inner edge on opposite sides of the tongue adapted to bear on the flat peripheral surfaces of the disc.

2. In a circular saw, the combination with a hub disc having a plurality of sockets extending radially inwardly from the periphery of the disc and having peripheral flat segments disposed on each side of said sockets, of a plurality of tooth-carrying segments, the side walls of each tapering inwardly and each having a shank disposed and intermediate of its ends and adapted to fit a socket in the disc, and a flat bearing surface on its inner edge on each side of said shank and adapted to bear on the flat peripheral surface of the disc.

3. In a circular saw, the combination with a disc having a plurality of sockets extending radially inwardly from the periphery of the disc and peripheral flat segments disposed on each side of said sockets, of a plurality of tooth carrying segments adapted for support by said disc, each having the side walls thereof tapered inwardly, and a segmental opening extending therethrough at each side wall, each tooth segment having a shank disposed intermediate of its ends and adapted to fit a socket in the disc, and a flat bearing surface on its inner edge on each side of said shank adapted to bear on the flat peripheral surfaces of the disc, and rivets extending through the adjacent segmental openings in the tooth-carrying segments for locking said segments together.

4. In a circular saw, the combination with a hub disc having a plurality of sockets radially extending inwardly from the periphery of the disc and peripheral flat segments disposed on each side of said sockets, one of the walls of the socket having a semicircular opening therein, of a plurality of tooth carrying segments adapted for support on said disc, each having a shank adapted to fit a socket in the disc, one edge of said shank having a semicircular recess coinciding with the semicircular recess in the wall of the socket, said segment having flat surfaces on its inner edge adapted to bear on the flat peripheral surfaces of the disc, and a rivet passage through the coinciding openings in the shank and disc for holding the segment in position.

5. In a circular saw, the combination with a hub disc having a plurality of sockets radially extending inwardly from the periphery of the disc and peripheral flat segments disposed on each side of said sockets, the walls of said sockets and said flat segments having fins extending therefrom, of a plurality of tooth-carrying segments adapted for support by said disc, each having a shank disposed intermediate of its ends and adapted to fit a socket in the disc and provided with fin-receiving grooves, and a flat bearing surface on its inner edge on each side of said shank adapted to bear on the flat peripheral surface of the disc, said bearing surfaces having fin-receiving recesses formed therein.

6. In a circular saw, the combination with a hub disc having a plurality of sockets radially extending inwardly from the periphery of the disc and peripheral flat segments disposed on each side of said sockets, of a plurality of tooth carrying segments adapted for support on said disc, said sockets and flat segments having fins extending from the walls thereof and one of the walls of the socket having a segmental opening therein, each of said tooth-carrying segments having a shank adapted to fit a socket in the disc and provided with fin-receiving grooves, flat bearing surfaces on the inner edge of said segments having fin-receiving grooves therein and adapted to bear on the flat segments of the disc, the adjacent edges of said segments having semicircular openings therein and rivets passing through the semicircular openings in the adjacent segments and through the coinciding semicircular openings in the disc and shank for locking said segments together and locking said segments to the disc.

7. In a circular saw, the combination with a hub disc having a plurality of sockets extending radially inwardly from the periphery of the disc and peripheral flat segmental surfaces disposed on each side of said sockets, of a plurality of tooth-carrying segments adapted for support on said disc, each having a shank adapted to fit a socket in the disc and a flat bearing surface on its inner edge adapted to bear on the flat peripheral surfaces of the disc and each having a passage extending from one face to the other to permit the flow therethrough of a cutting compound.

8. In a circular saw, the combination with a hub disc having a plurality of sockets radially extending inwardly from the periphery of said disc, said disc having peripheral flat segments disposed on each side of the sockets, of a plurality of tooth-carrying segments adapted for support on said disc, each having a shank disposed intermediate of its ends adapted to fit the sockets in said disc, both the side walls of said shank and the side walls of the shank-receiving recesses having inter-engaging recesses and fins, and said tooth-carrying segments each having a flat bearing surface on its inner edge on opposite sides of the shank adapted to bear on flat peripheral surfaces of the disc.

DEWEY E. GOMMEL.